April 15, 1952     H. V. HARDING     2,592,894

DISINTEGRATING OR REMOVING METALLIC MATERIAL

Filed May 10, 1949     2 SHEETS—SHEET 1

INVENTOR.
Henry V. Harding.
BY
Harness, Dickey & Pierce.
ATTORNEYS.

April 15, 1952  H. V. HARDING  2,592,894
DISINTEGRATING OR REMOVING METALLIC MATERIAL
Filed May 10, 1949  2 SHEETS—SHEET 2
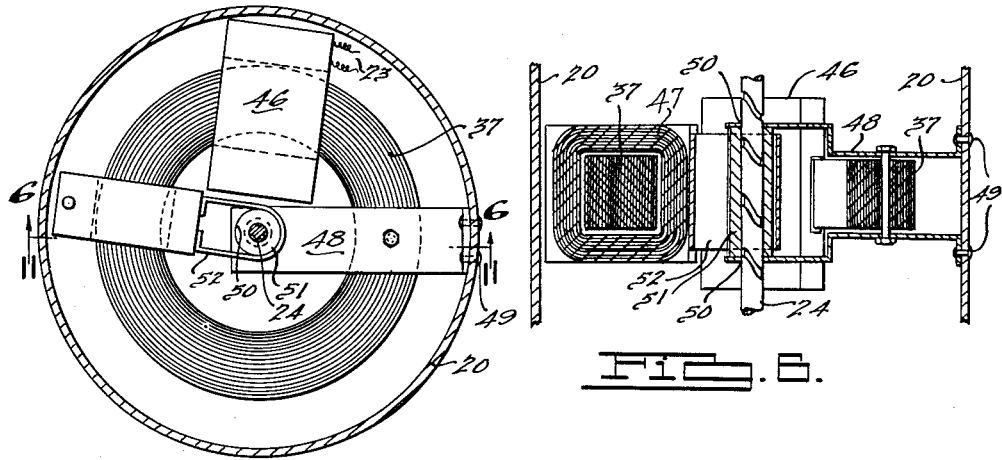
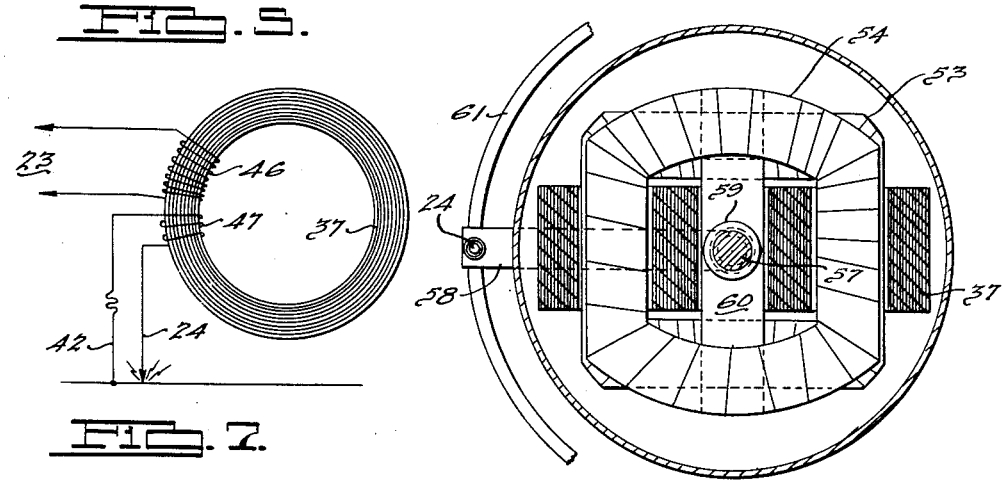
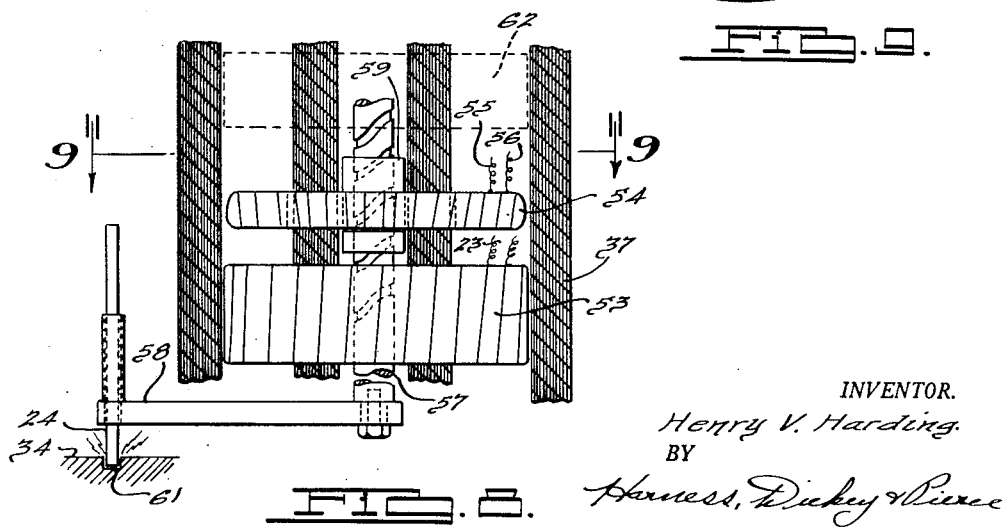
INVENTOR.
Henry V. Harding.
BY
ATTORNEYS.

Patented Apr. 15, 1952

2,592,894

UNITED STATES PATENT OFFICE 2,592,894

DISINTEGRATING OR REMOVING METALLIC MATERIAL

Henry V. Harding, Royal Oak, Mich., assignor, by mesne assignments, to Elox Corporation of Michigan, Clawson, Mich., a corporation of Michigan Application May 10, 1949, Serial No. 92,485

13 Claims. (Cl. 219—15)

1

This invention relates generally to the disintegrating of metal by means of an arc struck between a vibrating electrode and the metal to be disintegrated and in particular relates to a metal disintegrating apparatus which includes an improved means for bringing about a vibratory movement of the electrode.

A problem which constantly arises in machine work is the effective removal of taps, drills, etc., which break off and become embedded in the work piece. There have already been described machines for the removal of such broken pieces which operate by bringing a vibrating electrode into proximity with the work and causing a rapidly occurring arcing between the electrode and the metal. Further it has been taught that advantage may be secured by causing a fluid stream such as water to flow over the metal during the arcing and preferably to supply such fluid to the work through a hollow electrode. This operation causes the metal to disintegrate into small pieces which may be washed or blown away.

The vibratory action of the electrode in the most successful of the machines used to date has been secured by inducing rapidly alternating motion in an armature secured to the electrode and enclosed within the windings of a conductor wound helically around but spaced from the armature. The armature and electrode are normally engaged in a manner such that the raising of the energized armature serves to withdraw the electrode from contact with the work. This action causes an arc to form between the electrode and the work metal followed by a breaking of the circuit. The breaking of the circuit causes the armature to return to its initial position either by the force of gravity or by a spring action. The contacting of the electrode with the work again completes the circuit and the cycle repeats itself quite rapidly.

Because of the fact that the work pieces sometimes encountered are heavy and cumbersome it is impractical to bring such work pieces to the disintegrating machine. Rather, it is an important requirement of disintegrating machines that they be sufficiently portable to be brought to the work. Such portability requires that the unit be compact, relatively light, and, in general, easily handled. In this connection a particular disadvantage of the machines of the art has been their requirement of an external transformer. This need for an external transformer has seriously impaired the portability of disintegrating machines.

A second important disadvantage of the machines of the art relates to the fact that the manner of inducing vibratory action in the electrode necessarily causes a distinct breaking of the arc on each cycle and causes the electrode to space itself from the work during each cycle more than necessary for the most effective disintegrating action. In other words, these machines were incapable of securing what I call a "floating action" of the electrode. In "floating action" the electrode, although vibrating, to some extent, does not necessarily space itself from the work sufficiently to break the arc. Such a floating action is advantageous since the arc can be made practically continuous.

A third disadvantage of the disintegrating machines of the art concerns a limitation in the type of movement of the electrode relative to the movement of the armature. Specifically the direction of movement of the electrode has been limited to the same direction as the movement of the armature. The possibility of a radial cut or the possibility of moving the electrode over a given area of the work was made possible previously only by movement of the entire assembly.

It is an object of this invention to provide a metal disintegrating apparatus which is portable, efficient and adaptable to a relatively wider field of use than has heretofore been possible.

It is a further object to provide an apparatus which will eliminate the need for an external transformer and thus make the apparatus more portable.

It is a further object of the invention to incorporate within such apparatus a single means to serve as a transformer and to induce a vibration of the electrode.

It is an object to provide for a floating action in the electrode in order to maintain a substantially continuous arc between the electrode and the work.

It is a still further object to provide for the movement of the electrode over an area of the work rather than limiting its action to a fixed point relative to the apparatus.

We have now found that the foregoing and related objects can be secured in a metal disintegrating apparatus comprising, in a preferred embodiment, a housing; a transformer mounted within said housing, one coil of said transformer being fixed and the other coil being movable relative to the fixed coil; and an electrode, one end of which is secured to said movable coil for movement therewith and the other end of the electrode being outside the housing and adapted to contact the metal to be disintegrated; said movable coil, electrode, and metal forming a closed circuit when the electrode contacts the metal whereby an energizing of the fixed coil by a source of alternating current causes the movable coil to move away from the fixed coil and to cause the consequent movement of the electrode away from the metal, and said electrode being adapted to return to contact with the metal after said closed circuit is broken.

Other objects and features of novelty of the invention will be specifically pointed out or will become apparent when referring, for a better understanding of the invention, to the following description taken in conjunction with the accompanying drawings, wherein:

Fig. 5 is a sectional view of an alternative embodiment which introduces a floating action and an automatic feed of the electrode.

Fig. 6 is a sectional view of Fig. 5 along the line 6—6.

Fig. 7 is a schematic wiring diagram of Figs. 5 and 6.

Fig. 8 is a sectional view of an embodiment adapted to permit movement of an electrode over an area of the work.

Fig. 9 is a sectional view of Fig. 8 along the line 9—9.

Figure 1:
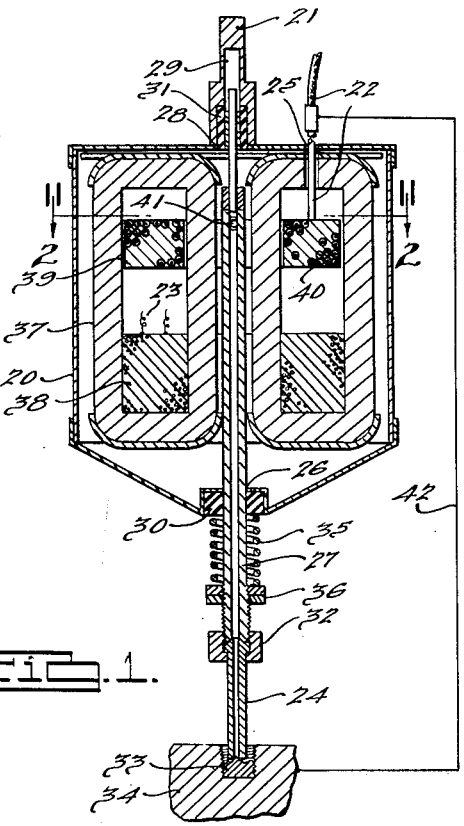
Fig. 1 is a sectional view of a metal disintegrating apparatus embodying features of the present invention.
Figure 2:
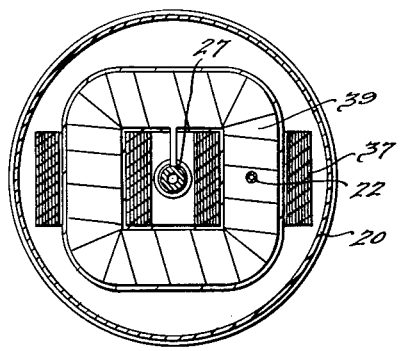
Fig. 2 is a sectional view of Fig. 1 along the line 2—2.

Referring more particularly to the drawings, the apparatus of the present invention consists generally of a housing 20, a means 21 for supporting the apparatus, a source 22 of fluid, a source 23 of alternating current, an electrode 24, and a means for vibrating the electrode. As shown in Figs. 1 and 2, the housing 20 is provided with an opening 25 adapted to permit the passage of fluid into the housing from a suitable source such as the conduit 22, the latter being insulated from the housing by a plastic sleeve (not shown). The housing is also provided with an opening 26 through which a hollow electrode holder 27 may be inserted in slideable engagement and with an oppositely disposed opening 28 at the top of the housing to support the upper end of the electrode holder in slideable engagement.

The extended member 21 of the housing 20 provides a means for clamping the assembly into a drill press chuck and the like. An open space 29 in the extended member 21 serves as a recess to receive the upper end of the electrode holder 27 as it is vibrated. The electrode holder 27 is insulated from the housing 20 by the insulating members 30 and 31. A hollow electrode 24 is shown attached to the electrode holder 27 by a suitable coupling 32 and is in proximity to the work piece which is illustrated as a broken tap 33 in the cavity of a metal piece 34. A spring 35 is positioned around the electrode 24 and between the bottom of the housing and the lug 36.

The vibratory mechanism as shown in Figs. 1 and 2 consists of a laminated iron core 37, a primary fixed winding 38, and a movable secondary winding 39. The secondary winding 39 consists of a conduit 40 which is attached at one end to the conduit 22 which supplies fluid from the exterior and the other end leads into the hollow electrode holder 27 at the port 41 to provide a passage of fluid from the exterior to the hollow electrode 31 via the secondary winding 39.

Figure 3:
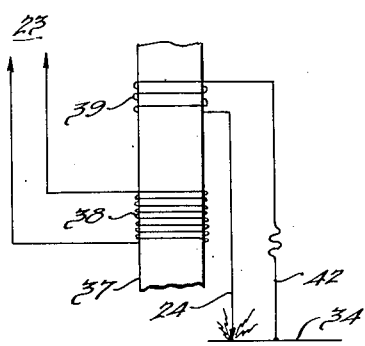
Fig. 3 shows schematically the wiring diagram of the apparatus shown in Figs. 1 and 2.

Fig. 3 illustrates schematically the wiring diagram of the apparatus of Figs. 1 and 2 wherein the primary winding 38 is shown attached to the source of alternating current 23 and the complete circuit of the movable secondary is shown to include the electrode 24, the work piece 34, the secondary winding 39 and the connecting wire 42. Although the drawings illustrate an electrode assembly comprising a so-called electrode holder and an electrode wherein the holder is secured to the moveable winding and the electrode contacts the work, it will be understood that the word "electrode" may include the whole assembly since the electrode may be one piece or several pieces as may be found convenient in various embodiments of the invention.

When alternating current is supplied to the apparatus of Figs. 1, 2 and 3 and the electrode is brought into contact with the work piece a transformer action is set up; that is, the iron core 37 and the secondary winding 39 are energized by the current flowing in the primary winding 38. This results in a repulsion of the two windings which causes the movable secondary winding to move away from the fixed primary winding and consequently causes the electrode to move away from the work piece. This movement of the electrode causes an arc to form between the electrode and the work. As the electrode is moved farther away from the work the arc is broken and the circuit of the secondary movable winding is open. The latter thereby ceases to be energized and the electrode again approaches the work either by the effects of gravity or by the aid of the spring 35. The cycle again repeats itself and a rapid vibratory motion is set up in the electrode, the resulting arcs causing a rapid erosion of the metal piece being contacted. The fluid which is preferably water, tends to cool the secondary winding and, further, aids in the erosion of the metal and the removal of the distintegrated particles from the work area.

Figure 4:
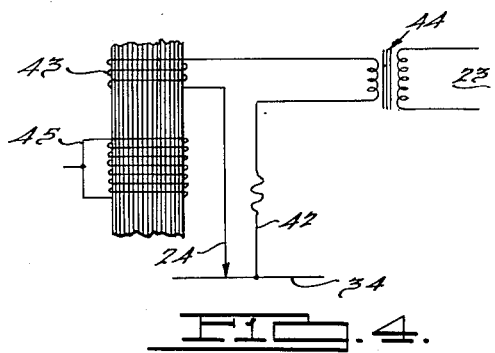
Fig. 4 illustrates the wiring diagram of an alternative embodiment of the invention especially adapted for heavy duty work with an external transformer.

Although the present invention finds its greatest utility where external transformers are not available, it is, nevertheless, highly advantageous to use the principle of the invention even when an external transformer is available for use. This is particularly true with heavy duty work and in shops where a substantially permanent installation is justified. The wiring diagram of this particular embodiment is shown in Fig. 4 wherein the movable winding 43 becomes the primary and is attached to a suitable source of alternating current 23 through the transformer 44. The circuit of the movable primary 43 also includes the electrode 24, the connecting wire 42 and the work piece 34. A complete circuit in the fixed secondary 45 is obtained by short circuiting the ends of the wire. In this manner the energizing of the movable primary sets up a transformer action as in the previous case. Thus, when the electrode is in contact with the work the circuit is complete and the two windings become energized. The moveable primary then moves away from the fixed secondary and the electrode moves away from the work. The sequence of events then follow as described in connection with Fig. 3.

Figs. 5, 6 and 7 illustrate an embodiment of the invention which takes advantage of the movable coil principle to provide for a so-called floating action in the electrode. Heretofore it has been the practice in the art to completely break the disintegrating arc, before initiating the next following cycle. I have found, however, that this is not necessary in the case of the present invention and a substantially complete arcing can be maintained by permitting the electrode to "float" or hover over the work and in close proximity thereto and with a certain amount of vibratory movement and yet with little or no breaking of the arc itself. As illustrated in Figs. 5, 6 and 7, the core 37 is in the shape of a ring or toroid and the core, which forms a ring type transformer with the windings, lies in a plane perpendicular to the electrode 24. As in the other embodiments, the electrode may be one piece or may comprise an electrode holder and the electrode proper. In the instant embodiment the primary coil 46 is shown as fixed and is provided with a suitable source of alternating current 23. The secondary winding 47 is illustrated as the movable winding and the work piece 34, electrode 24 and connecting wire 42 are a part of the secondary circuit. A bracket 48 secured to the housing 20 by the bolts 49 is provided with openings 50 through which the electrode 24 is slideably engaged. The electrode 24, which may be hollow for the passage of fluids therethrough in accordance with the preferred embodiment of the invention, is threaded and a nut 51, secured to the movable winding 47 by means of the bracket 52, is movably mounted on said threads between the oppositely disposed plates of the bracket 48.

When alternating current is supplied to the primary winding of the apparatus of Figs. 5, 6 and 7 and the secondary circuit is closed by contact of the electrode with the work piece, the secondary circuit is energized and the movable electrode moves away from the fixed electrode. As in the previous cases this causes the electrode to move away from the work piece and to strike an arc.

However, in this particular embodiment the movable winding is not attached directly to the electrode but rather tends to move in an arc of an orbit, the plane of which is perpendicular to the electrode. The secondary winding 47 being secured to the nut 51, an orbital movement of the secondary causes the nut to rotate on the threaded electrode. Since the nut itself is fixed against vertical movement its rotation causes the threaded shaft of the electrode to be raised or lowered according to the direction of movement of the movable winding. In the present case the electrode shaft should be threaded in a direction such that a repulsion of the movable coil will cause the shaft to rise. This action is relatively slower than the simultaneous vibratory movement of both winding and electrode as illustrated in Fig. 1 and in the present case the arc is not readily broken. As in the previous case, the secondary works against a variable spring return and there is a tendency for a balance to be reached between the thrust of the coil and the return spring. Thus, the usual continuous striking and breaking of the arc is not obtained but rather the electrode tends to hover over the work and in close proximity thereto. However, if the arc breaks, the spring returns the electrode to contact with the work piece.

An additional advantage is secured in this embodiment in view of the fact that the electrode is not rigidly secured to the movable winding; that is, the electrode is automatically fed into the face of the work piece as material is eroded.

Figs. 8 and 9 illustrate an embodiment of the invention which provides for the forming of a variety of radial or orbital cuts 61 or provides for the movement of the electrode over a specific work area which may be substantially larger than the cross sectional area of the electrode. As illustrated, a fixed primary 53 is provided with a suitable source of alternating current 23. A secondary winding 54 is the movable coil and forms a circuit with the electrode and the work piece by means of the leads 55 and 56. The electrode, which again may be considered as a unit, is illustrated as comprising the electrode proper 24, a threaded shaft 57, and a radial arm 58 connecting said electrode and said shaft. A nut 59 is fixed to the secondary winding by a bracket 60 and is movably mounted on the threaded shaft 57, the latter being fixed against vertical movement.

In the apparatus of Figs. 8 and 9, an energizing of the primary winding causes the secondary winding to move away from the primary and thus to revolve the threaded shaft. The latter movement, in turn, induces an arcuate movement of the electrode over the work. The arcing from an electrode in orbital movement, as in the instant case, is preferably secured by a dragging of the electrode over the work rather than by a withdrawal of the electrode vertically from the work as in the embodiments described previously. The cutting or disintegrating action is, however, the same, the arc tending to trail along behind the electrode. It will be apparent that many modifications of this embodiment may be constructed to provide for a number of types of cuts by the moving electrode. For example, an additional fixed winding 62 may be placed above the movable winding in the position indicated by the dotted lines in Fig. 8. The primary 62 can be energized alternately to the primary 53 by means of timing mechanisms. In this manner the electrode may be made to complete a revolution and reverse direction or may be made to cut any predetermined arc length.

I claim:

1. In a metal disintegrating apparatus; the improvement which comprises a transformer, one winding of which is fixed and the other winding of which is movable relative to the first winding; and an electrode secured to the movable winding for movement therewith and wherein one of said windings is adapted to be energized by an alternating current.

2. In a metal disintegrating apparatus; the improvement which comprises a transformer, one winding of which is fixed and the other of which is movable relative to the first winding; and an electrode secured to and insulated from the movable winding for movement therewith and wherein the electrode, and the metal to be disintegrated form an electrical circuit and wherein one of said windings is adapted to be energized by an alternating current.

3. In a metal disintegrating apparatus; the improvement which comprises a transformer, one winding of which is fixed and the other winding of which is movable relative to the first winding; and an electrode secured to and insulated from the movable winding for movement therewith and wherein the electrode, and the metal to be disintegrated form an electrical circuit, wherein one of said windings is adapted to be energized by an alternating current, and wherein the conductor of said movable winding and the electrode are hollow in a manner to provide for the continuous passage of fluid therethrough.

4. A metal disintegrating apparatus comprising a housing; a transformer within said housing, one winding of said transformer being fixed and the other winding being movable relative to the first winding; an electrode, one end of which is secured to said movable winding for movement therewith and the other end of said electrode being outside the housing and adapted to contact the metal to be disintegrated; and wherein said movable winding, said electrode and said metal form a closed circuit when the electrode contacts the metal, wherein one of said windings is adapted to be energized by an alternating current and the other winding is adapted to be energized by a closing of the electrode circuit in a manner such that the energizing of said windings causes the movable winding to move away from the fixed winding and consequently the electrode to move away from the metal, and wherein the electrode is adapted to return to contact with the metal when said electrode circuit is broken.

5. A metal disintegrating apparatus comprising a ring-type transformer which includes a fixed winding and a movable winding; an electrode which includes a threaded shaft mounted perpendicular to the plane of said ring; and a means such as a nut or the like secured to said movable winding, screwed on said threaded shaft and fixed against vertical movement.

6. In a metal disintegrating apparatus; the combination of a transformer which includes a fixed winding and a movable winding mounted on a toroidal core; an electrode which includes a threaded shaft mounted perpendicular to the plane of said core; and a means such as a nut or the like secured to said movable winding and mounted for rotation on said threaded shaft in a manner such that a movement of the movable winding away from the fixed winding causes the shaft to be raised; and wherein one of said windings is adapted to be energized by an alternating current.

7. In a metal disintegrating apparatus; the combination of a transformer which includes a fixed winding and a movable winding mounted on a toroidal core; an electrode including a threaded shaft portion mounted perpendicular to the plane of said core; and a means such as a nut or the like secured to said movable winding and mounted for rotation on said threaded shaft in a manner such that a movement of the movable winding away from the fixed winding causes the shaft to be raised; and wherein said movable winding, said electrode shaft, and the metal to be disintegrated form an electrical circuit and wherein one of said windings is adapted to be energized by an alternating current.

8. A portable, self-contained, unitary metal disintegrating tool housing its electrical power-converting and activating elements within the tool body composing a fixed transformer primary coil within the tool body, a movable transformer secondary coil within the tool body, an electrode protruding from the tool body mechanically connected to said movable coil for movement therewith, and means biasing said electrode and movable coil toward metal to be disintegrated; said transformer coils being so adapted that upon said secondary coil being energized upon its circuit being closed via said electrode contacting the work, said secondary coil is repulsed to overcome said means to effect breaking electrical contact between said electrode and metal to be disintegrated.

9. A unitary metal disintegrating apparatus comprising a fixed winding, a movable winding, and an electrode connected to said movable winding said electrode being biased toward metal to be disintegrated; said movable winding being adapted to be repulsed when said movable winding is energized to overcome the bias on said electrode.

10. A self-contained metal disintegrating tool comprising a fixed transformer primary coil within the tool body, a movable transformer secondary coil within the tool body, and an electrode attached to said secondary coil; said electrode being biased in one direction, preferably toward metal to be disintegrated; said movable secondary coil being adapted to be repulsed when said primary coil is energized to overcome the bias on said electrode and to move said electrode in a direction opposite to the biased direction.

11. In a device as set forth in claim 9 said movable winding being adapted to move rotationally; a nut surrounding said electrode adapted to rotationally move with said movable winding, and a thread on said electrode meshing with said nut so that movement of said nut relative to said electrode overcomes the bias on said electrode.

12. In a device as set forth in claim 9, a nut carried by said movable secondary winding, a thread on said electrode meshing with said nut so that relative endwise movement between said movable secondary winding and said electrode is converted to rotary motion of the electrode.

13. In a device as set forth in claim 12, said electrode being off-set so as to describe an arc as it rotates.

HENRY V. HARDING.

REFERENCES CITED

The following references are of record in the file of this patent:

UNITED STATES PATENTS

| Number | Name | Date |
| --- | --- | --- |
| 1,993,961 | Groven et al. | Mar. 12, 1935 |
| 2,223,902 | Somes | Dec. 3, 1940 |
| 2,383,383 | Harding | Aug. 21, 1945 |
| 2,399,212 | Dawson et al. | Apr. 30, 1946 |
| 2,401,528 | Vang | June 4, 1946 |